United States Patent [19]

Rathbun et al.

[11] Patent Number: 4,495,033
[45] Date of Patent: Jan. 22, 1985

[54] CONTINUOUS STILL

[76] Inventors: Robert G. Rathbun, 401 E. Toppenish Ave.; Albert J. Thalheimer, Rte. 3 Box 3718, both of Toppenish, Wash. 98948

[21] Appl. No.: 285,354
[22] Filed: Jul. 20, 1981
[51] Int. Cl.³ ............................................. B01D 3/04
[52] U.S. Cl. ................................. 202/118; 196/110; 202/237
[58] Field of Search ............... 196/104, 110, 123, 126, 196/129, 133, 135, 136, 137, 155; 202/118, 175, 237, 265, 270; 203/92, 95, 99; 422/244, 307, 308, 309

[56] References Cited
U.S. PATENT DOCUMENTS
631,287  8/1899  Euston .................................. 422/308
2,690,019  9/1954  Bachmann ........................... 202/237

Primary Examiner—Frank Sever
Attorney, Agent, or Firm—Thomas W. Secrest

[57] ABSTRACT

This invention is directed to a continuous still and a continuous process for separating a volatile organic material from a fibrous material of plant origin. The fibrous material of plant origin is simultaneously agitated and steam is introduced to heat the fibrous material. The volatile organic material is vaporized to form a vaporous mixture of the volatile organic material and steam. This vaporous mixture can be condensed to a liquid mixture of the liquid organic material and water. Then, the liquid organic material and the water can be separated. An example of fibrous material of plant origin is mint hay. The liquid organic material is mint oil.

9 Claims, 14 Drawing Figures

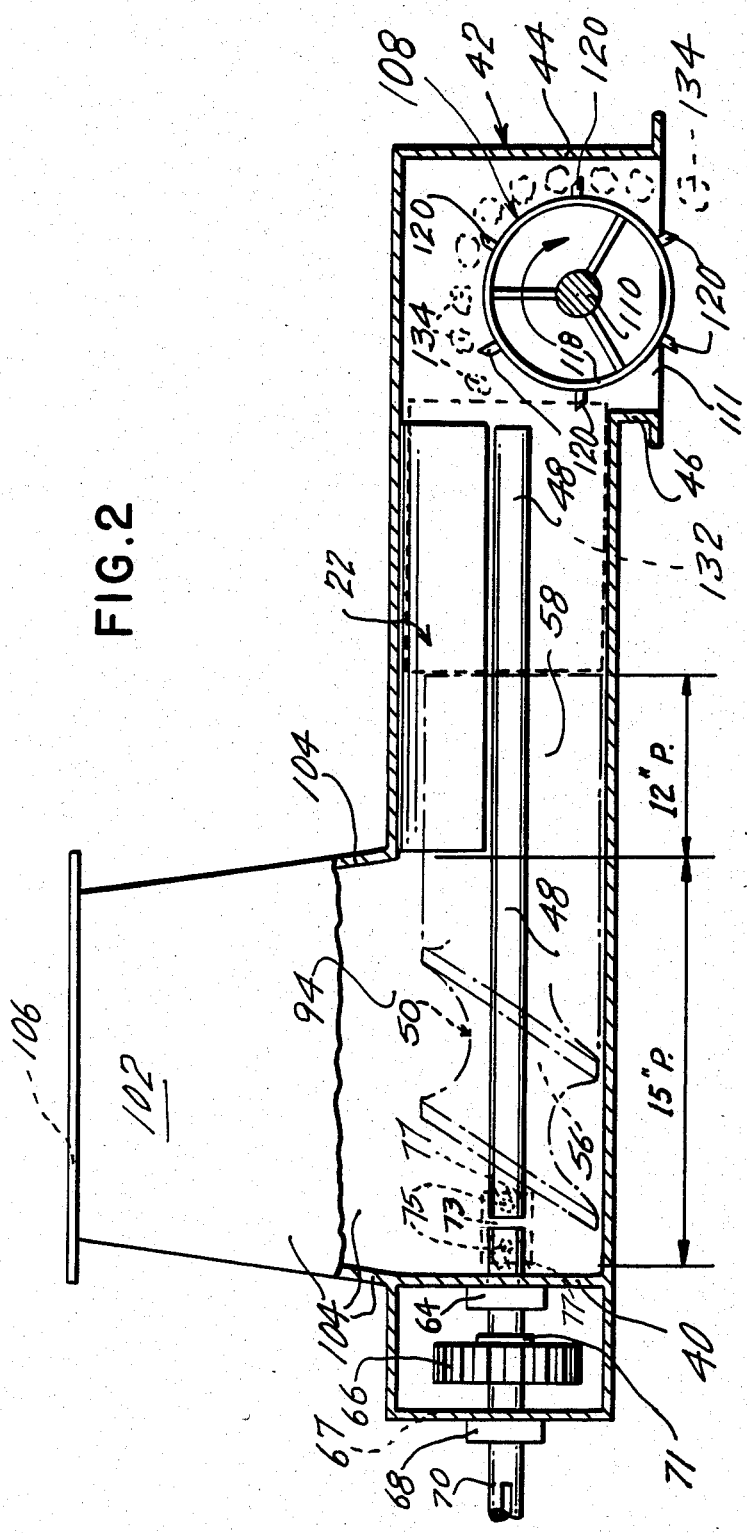

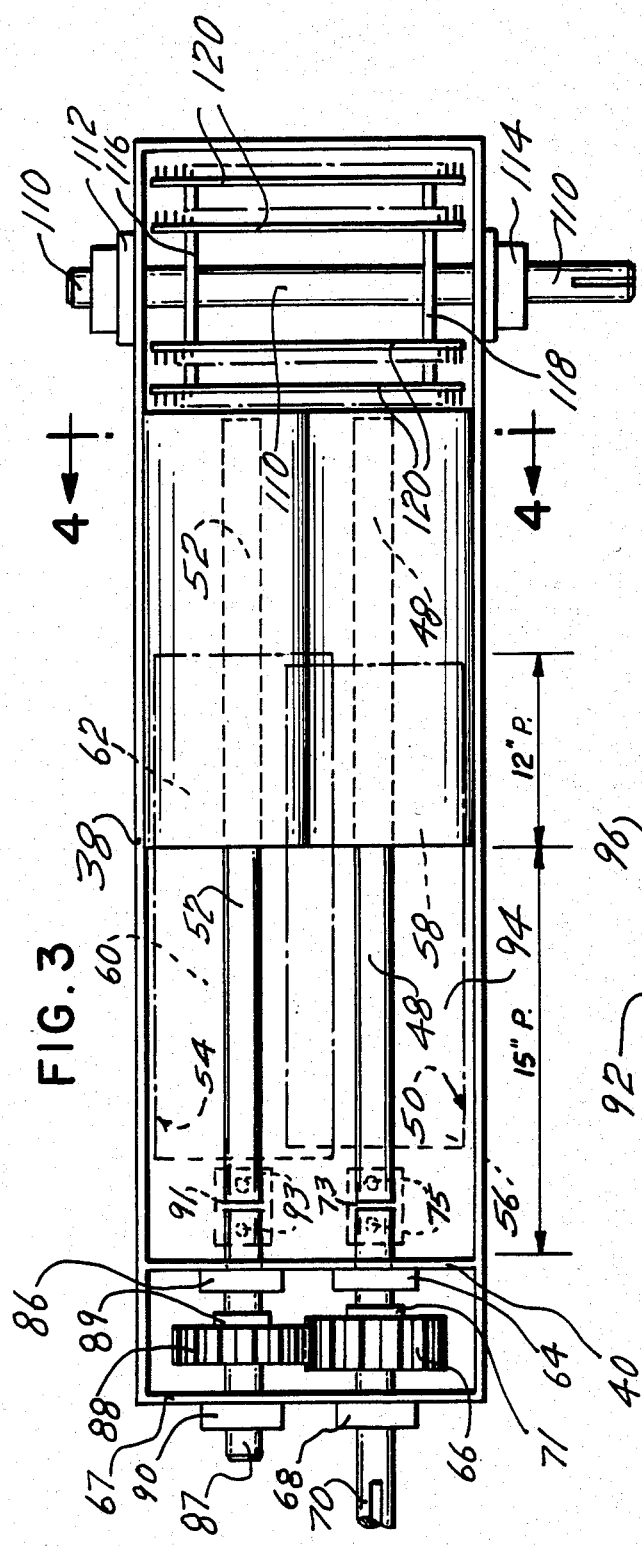

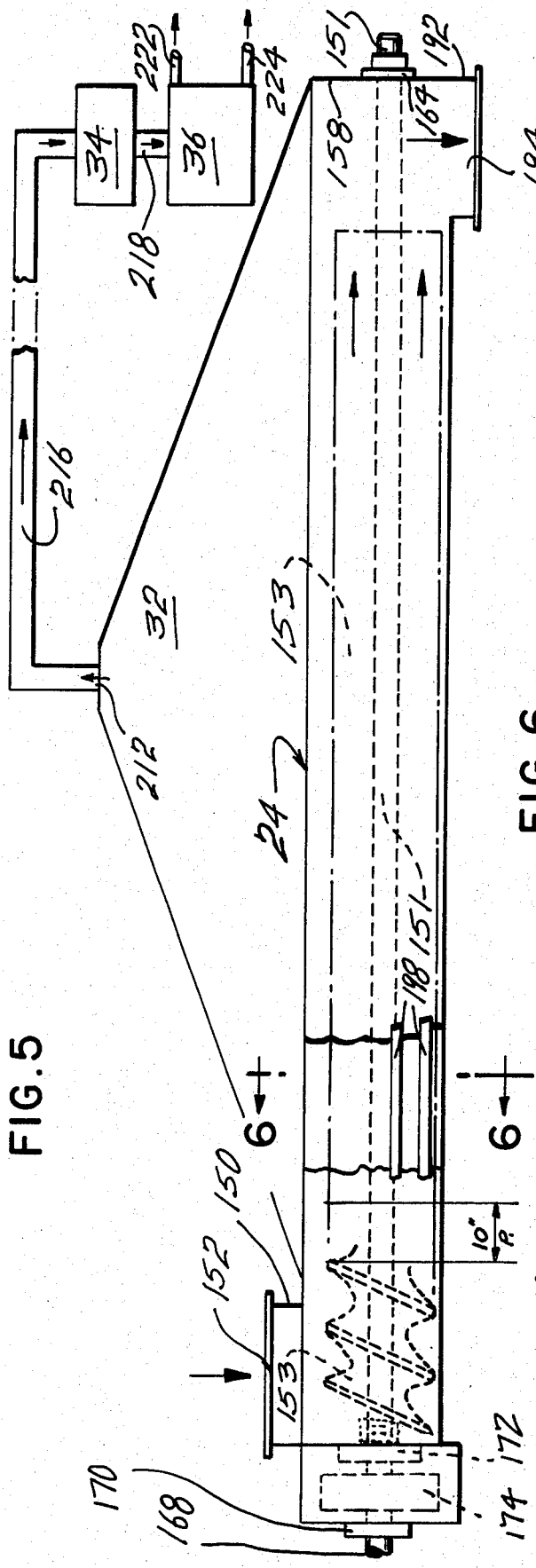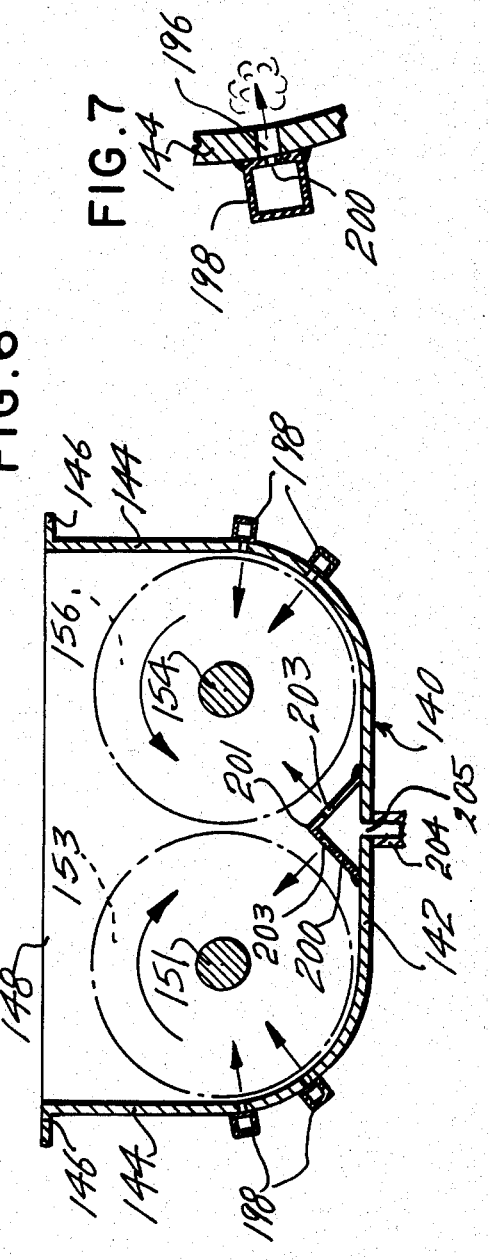

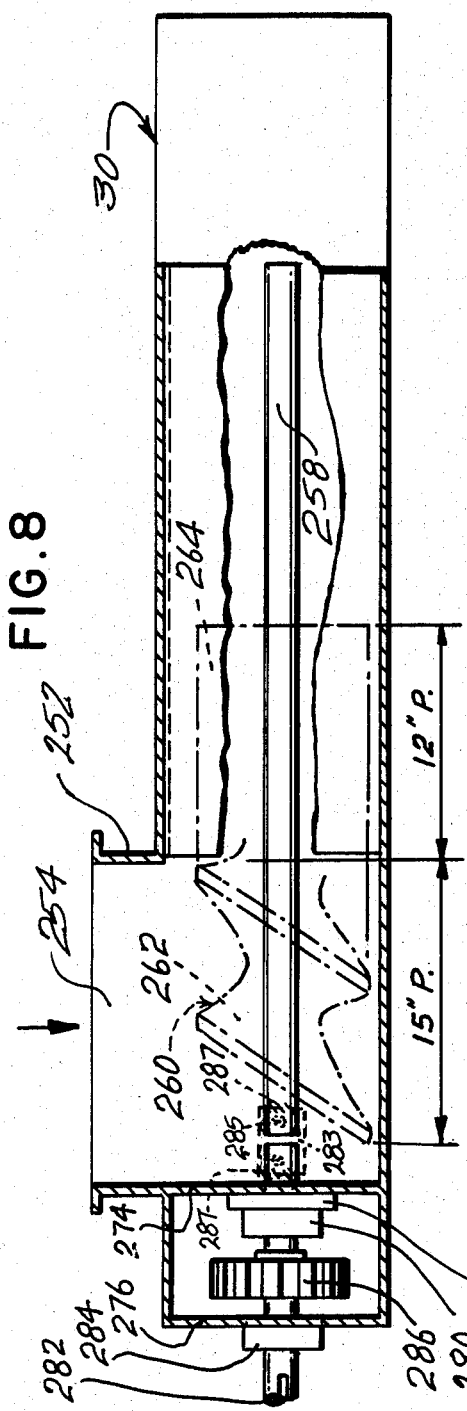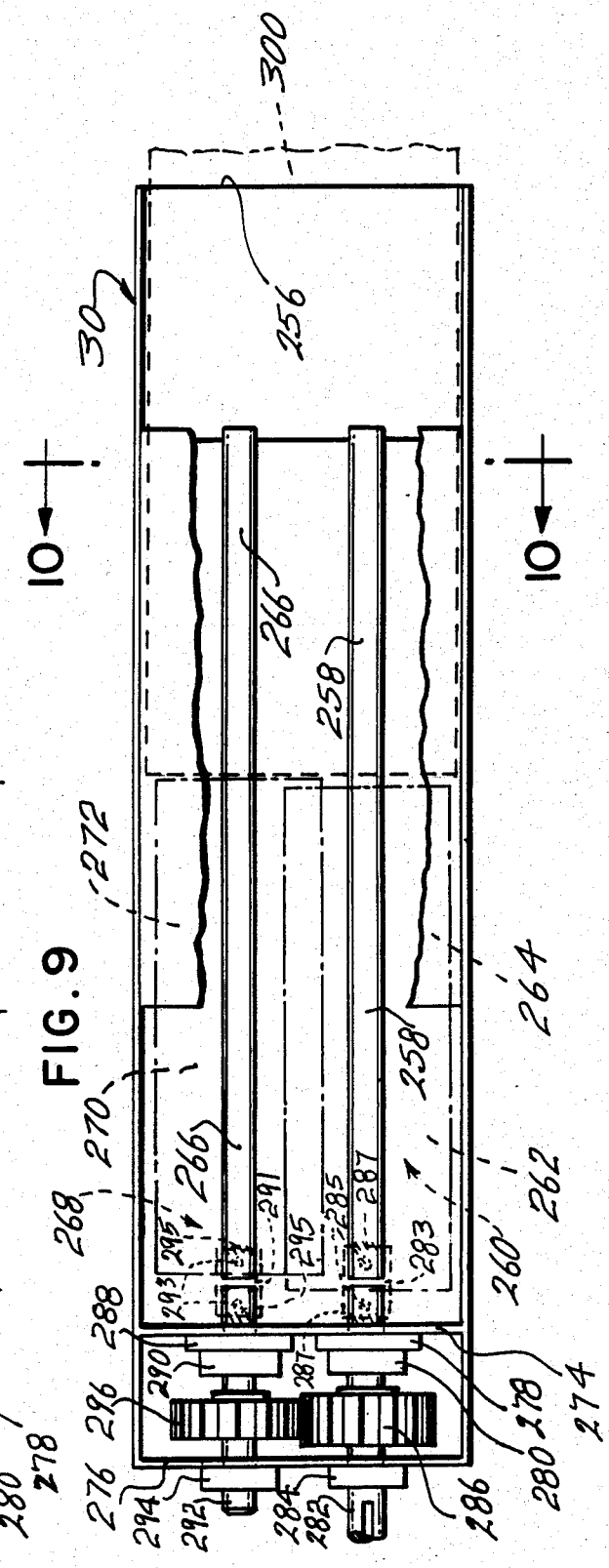

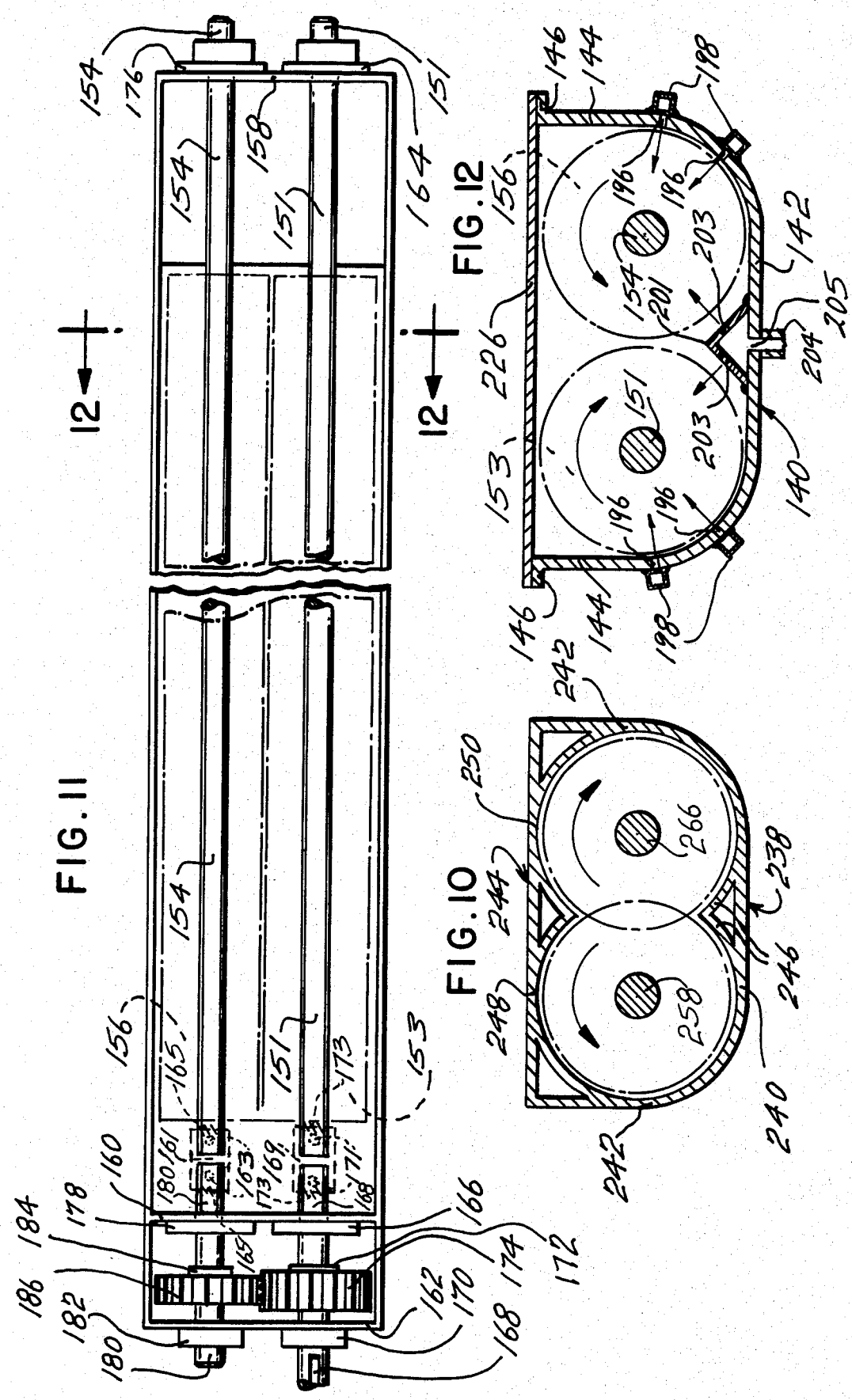

CONTINUOUS STILL

THE BACKGROUND OF THE INVENTION

Some fibrous material of plant origin comprises fiber and volatile organic material among other components. The volatile organic material is desireable as it can be used in the manufacturing of valuable products.

At the present time standard apparatus and process for separating the volatile organic material from the fiber and other components comprises a batch distillation process. An example is the isolation of mint oil from mint hay or the isolation of a volatile organic material (mint oil) from fiber and other components in the mint hay.

The mint oil is distilled out of mint hay. A tank measuring about 18 feet long, 7½ feet wide and 6 feet tall is taken out into the field of mint hay. The tank contains steam lines in the bottom. In the field the mint hay is, chopped and blown into the tank.

Then, the tank is taken from the field to the still and the steam lines in the bottom of the tank are connected to the steam lines from a large boiler. For a tank of this size the minimum size boiler is about 600 horsepower.

The steam from the boiler is introduced into the mint hay through the steam lines in the bottom of the tank. The mint hay in the tank is cooked for about one and one half hours. An approximate breakdown of the time required is that it takes about 20 to 25 minutes to force the steam through the mint hay in the tank. Then, for about another 20 minutes there is a good flow of a mixture of steam and mint oil to the condenser. After this 20 minute period of a good flow of a mixture of steam and oil from the mint hay in the tank the amount of oil coming off with the steam decreases for about 45 minutes. At that time the operator considers that he is spending more money on the fuel than he is receiving mint oil and the operation is not profitable. Therefore, the flow of steam to the tank is terminated and the tank is removed from the still. The residue from the mint hay, after the volatile mint oil has become a vapor and passes from the tank with the steam, is dumped into long piles and these long piles are later spread on the fields. At the present time two or three tanks of mint hay are, simultaneously, cooked.

The mixture of steam and volatile mint oil flows from the tank, as a vapor, to a condenser. In the condenser the vaporous mixture of mint oil and steam is condensed into a liquid mixture of water and mint oil. This liquid mixture of water and mint oil flows to a settling tank. The mint oil and water are immiscible and the mint oil, being of a lesser specific gravity than the water, rises to the top of the water and is drawn off into barrels. The mint oil is then ready to be shipped to a place of destination such as for use as mint flavoring in gum.

In the batch process for separating the volatile mint oil from the mint hay there is used about one gallon of diesel oil to distill and remove one pound of mint oil from the mint hay. It is estimated that in the year 1980 that there was distilled about 4,894,000 pounds of peppermint oil and 2,214,000 pounds of spearmint oil for a total of about 7,108,000 pounds of mint oil. In the midwestern part of the United States natural gas is used in the distillation process to fire the boilers to generate steam. However, the vast majority of the batch distillation processes use diesel oil to fire the boilers to generate steam for the distillation step. This can be interpreted to mean that in the year 1980 about 7,108,000 gallons of diesel oil were used to fire the boilers to generate steam to separate the volatile mint oil from the mint hay.

One of the reasons the use of diesel oil is so high, approximately one gallon of diesel oil for each pound of mint oil separated from the mint hay, is that the large steel tank is not insulated. With such a large steel tank not being insulated, there is a large surface area for the heat energy to be radiated away from the tank and also to be taken away by convention of air flowing over the surface of the tank. The large steel tank is moved and while being moved the insulation is damaged. The cost of repairing the damaged insulation is so expensive that a tank without insulation is used.

A BRIEF DESCRIPTION OF THE INVENTION

This invention is directed to a continuous still for continuously volatilizing the mint oil (volatile organic material) from the mint hay With the continuous still the mint hay will be chopped and blown into a truck or a wagon, in the field, and taken to the still. There is a continuous conveyor that feeds the chopped mint hay to a cooking unit. In the cooking unit or cooking chamber there are screw augers or conveyors for moving the mint hay through the cooking chamber. The cooking chamber is horiztontal or, substantially, horizontal. The screw augers or conveyors agitate the mint hay, tumble and mix the mint hay so as to expose different surfaces for driving off and distilling the mint oil. Steam, by means of steam lines, is injected into the bottom portion of the cooking chamber so as to heat the mint hay. The warm steam mixes with the volatile mint oil to form a vaporous mixture of steam and mint oil. The residue of the mint hay or the fiber and other components remaining from the mint hay after the mint oil has been volatilized and passed off as a vapor can be collected and discarded. One use for the fiber and other components is to spread the same onto the fields so as to act as a mulch or another use is to feed it to livestock such as sheep and cattle as a feed and as a fibrous mass.

The vaporous mixture of steam and mint oil passes from the cooker to a condenser where it is condensed to a liquid mixture of water and liquid mint oil. This liquid mixture of water and liquid mint oil is placed into a settling tank. The liquid mint oil and the water are immiscible. The liquid mint oil, being of a less specific gravity than the water, rises to the top of the settling tank and can be drawn off of the water and from the settling tank. When the liquid mint oil is collected it can be sold and shipped to a place to be used in manufacturing processes.

The cooking unit of the continuous still will be cooking mint hay that is only about five inches deep and which is also being agitated and tumbled so as to expose fresh surfaces of the mint hay to the steam. In this situation the mint oil in the mint hay is volatilized and made into a vapor in a time period of about five minutes to eight minutes in the cooker. It is possible by adjusting the speed of the screw augers or conveyors to vary the time the mint hay is in the cooker. This varying of the speed of the screw auger or conveyor may be necessary because of different kinds and different qualities of mint hay being processed. It is to be realized that by adding to the length of the cooker the amount of mint hay that can be processed in a unit of time can be increased.

The continuous still is insulated so as to lessen the transfer of heat energy to the surrounding atmosphere by convection and also by radiation. Because of the insulation there is a less loss of heat energy from the continuous still as contrasted with the loss of heat energy by the batch still. Further, because this is a continuous still it is not necessary to heat a still, maintain the heat for a period of time to drive off the mint oil from the mint hay, and then to cool the still so as to take out the fiber and residue and other components remaining after the mint oil has been removed from the mint hay as with the batch still and the batch process for separating mint oil from mint hay. With the continuous still the still can be operated all of the time or for 24 hours per day. With the continuous still a good flow of mint oil will be coming out of the cooker at all times as compared to about 20 minutes worth of a good flow of mint oil, in one and one half hours of cooking in a batch still or a batch process. Further, with a continuous still a 200 horsepower boiler will handle the making of the steam for cooking the mint hay as compared with a 600 horsepower boiler, or larger boiler, for use with a batch still or a batch process. The result is that there is required, due to a saving of heat energy, less diesel fuel. For example, only about one third of the amount of diesel fuel is required to make steam, with a continuous still, as compared with the amount of diesel fuel required to make steam with a batch still or a batch process. As previously stated it is estimated that to secure about 7,108,000 pounds of mint oil there is required about 7,108,000 gallons of diesel oil with a batch still or in the batch process. With a continuous still only about one third of this amount of diesel would be required, or about 2,370,000 gallons of diesel would be required for approximately 7,108,000 pounds of mint oil. The result is a savings of approximately 4,738,000 gallons of diesel oil when using a continuous still, as compared with a batch still, for securing the same amount of mint oil.

THE DRAWINGS

FIG. 2 is a longitudinal vertical cross-section view of the feed unit and illustrates a hopper leading to the feed unit and a cutter or discharge reel for separating the plug of fibrous material into smaller units of fibrous material;

FIG. 3 is a top plan view of the feed unit;

Figure 13:
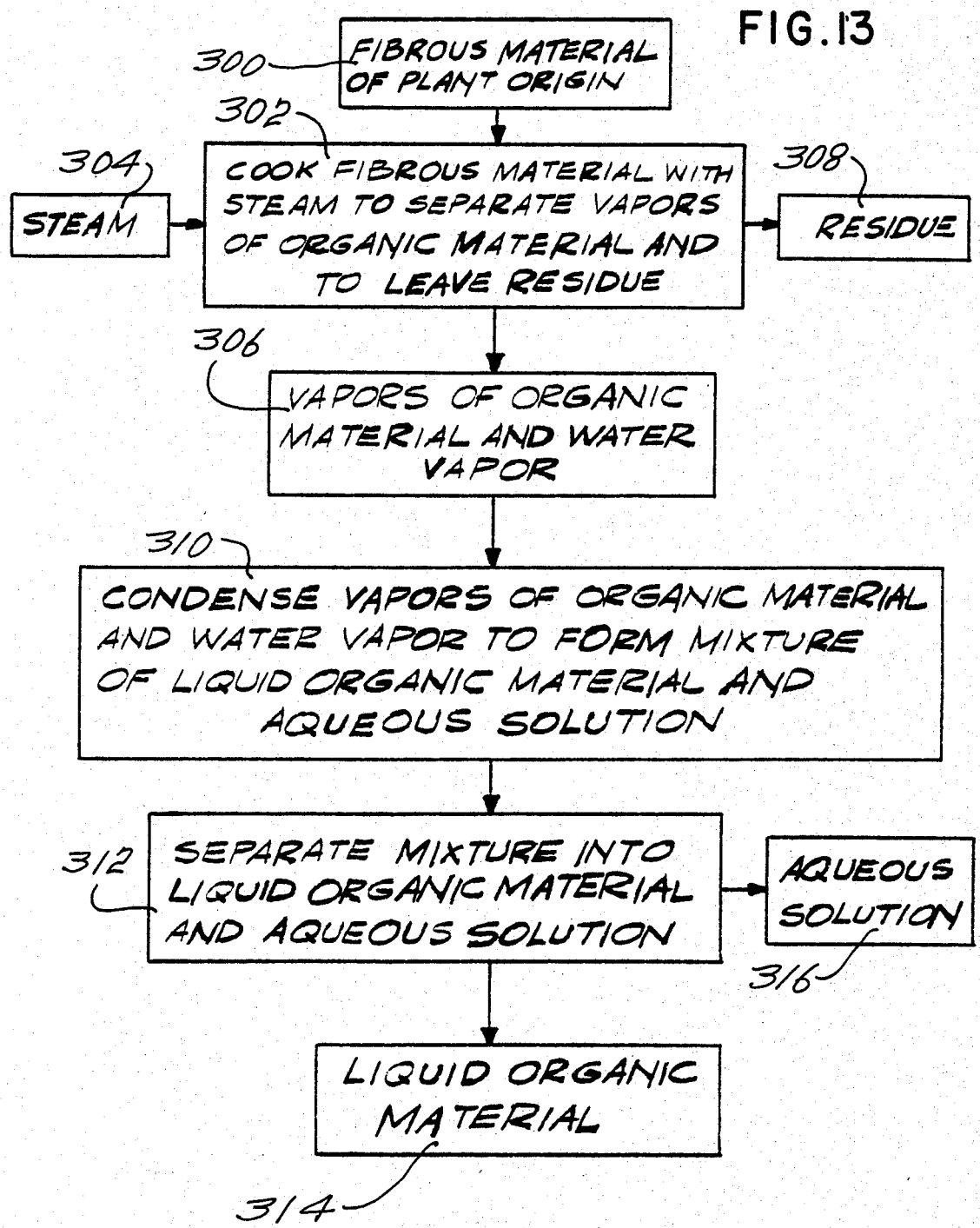
Figure 14:
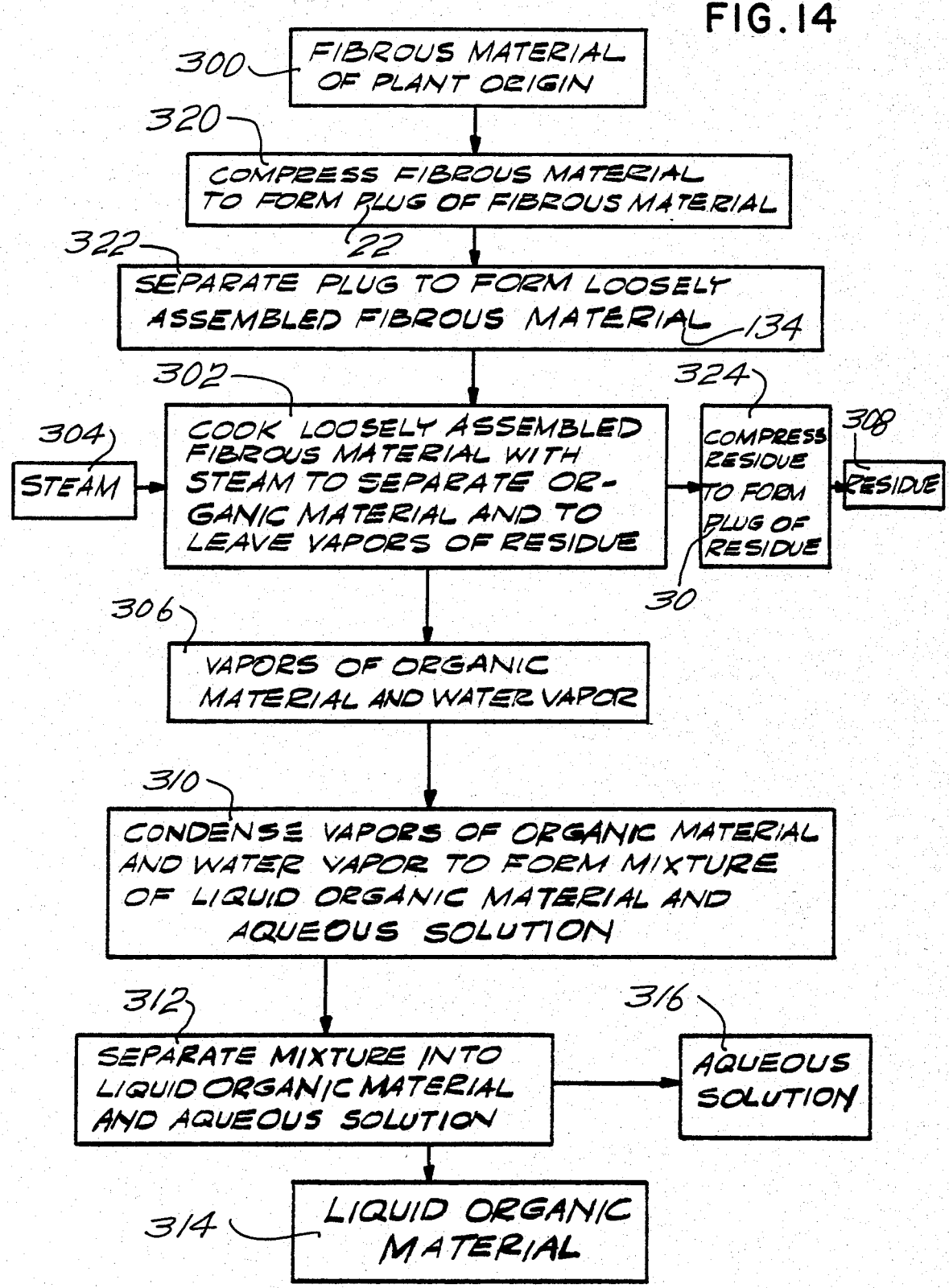

FIG. 4, taken on line 4—4 of FIG. 3, is a lateral cross-sectional view illustrating the two screws which overlap so as to compress the fibrous material of plant origin into a plug to act as a valve to stop the flow of vaporous material from the cookers and out of the feed unit;

FIG. 5 is a longitudinal vertical cross-sectional view illustrating the top cooker, the hood connecting with the top cooker for collecting the vapors from the cooker, the condenser connecting with the hood and a separater connecting with the condenser;

FIG. 6, on an enlarged scale, taken on line 6—6 of FIG. 5 is a vertical lateral cross-sectional view illustrating the two scres in the cooker, and which screws do not overlap, and also the steam header and steam ports for introducing steam into the cookers;

FIG. 7, on an enlarged scale, illustrates the outside wall of the cooker, a steam port in the wall and a steam manifold for directing steam to the steam port and into the cooker;

FIG. 8 is a longitudinal cross-sectional view of the discharge unit and which discharge unit connects with the cooker;

FIG. 9 is a top plan view of the discharge unit;

FIG. 10, taken on line 10—10 of FIG. 9, is a lateral cross-sectional view of the discharge unit and illustrates the two overlapping augers or screws for forming a plug in the discharge unit to prevent the escape of vaporous material from the cookers and through the discharge unit;

FIG. 11 is a top plan view of a cooking unit;

FIG. 12, taken on line 12—12 of FIG. 11, is a lateral vertical cross-sectional view of the cooker unit and shows the twin screws, the steam ports and the steam manifolds, and a cover for the cooker unit to prevent the escape of vapors out of the top of the cooker unit;

FIG. 13 is a flow sheet of the process for removing volatile organic material from the fibrous material of plant origin, then condensing the volatile organic material and separating the same from water, and leaving a residue from the fibrous material of plant origin; and FIG. 14 is flow sheet of a process for removing volatile organic material from fibrous material of plant origin, condensing the organic material to liquid in an aqueous solution, separating the organic material from the aqueous solution and leaving a residue from the fibrous material of plant origin.

A DETAILED DESCRIPTION OF THE INVENTION

In the drawings it is seen that the invention comprises a continuous still 20. The still 20 comprises a feed unit 22 which connects with the cooker 24. The cooker 24 connects with the cooker 26 which in turn connects with the cooker 28. The cooker 28 connects with the discharge unit 30. Also, a hood 32 connects with the top cooker 24 so as to direct the vapors from the top cooker 24 to the condenser 34 which in turn connects with the separater 36.

The feed unit 24 is a trough 38 having a bottom and two sides. The trough 38 is of a generally, U-configuration. On the upper end of each wall there is an outwardly directed finger so as to form a platform.

In FIG. 2 it is seen that at the left end of the trough 38 there is a wall 40. At the right end of the trough 38 there is a discharge end 42 and an end wall 44.

In the inner end of the discharge end 42 there is a downwardly directed wall 46 which connects with the bottom of the trough 38. The lower end of the end wall 44 and the downwardly directed inner wall define an outlet spout or an outlet opening.

In the trough 38 there is positioned a first shaft 48. On the first shaft 48 there is a right hand auger or a right hand screw 50. Also, in the trough 38 there is a second shaft 52. On the second shaft 52 there is a left hand auger or a left hand screw 54.

The right hand auger or right hand screw 50 comprises a first section 56 and a second section 58. In FIG. 3 it is seen that the first section 56 is to the left of the second section 58. The pitch of the screw in the first section 56 is a large pitch, 15 inch pitch, and the pitch of the screw in the second section 58 is a smaller pitch, 12 inch pitch.

The auger of screw 54 comprises a first section 60 and a second section 62. The pitch of the screw in the first section 60 is a large pitch, a 15 inch pitch, and the pitch of the screw in the second section 62 is a smaller pitch, a 12 inch pitch. The two augers or screws 50 and 54, overlap, see FIG. 4.

On the outside of the wall 40 there is a first bearing 64.

The trough 38 comprises an outside wall 67. There is a second bearing 68 on the outside of the outside wall 67. A drive shaft 70 is journaled in the second bearing 68. The drive shaft 70 passes through an opening in an outside wall 67. The first gear 66 is mounted on the drive shaft 70. The gear 66 has a hub 71. The drive shaft 70 is journalled in bearings 68 and 64 and projects through the passageway in the wall 40 and into the chamber of the feed unit 22. A union 73, in phantom, by means of pins 75 connects together the shafts 70 and 48.

On the outside of the outside wall 67 there is a first pulley 72 mounted on the drive shaft 70. There is also a second pulley 74. A drive belt 76 connects the first pulley 72 and the second pulley 74. There is a motor 80 having an output shaft 82. The second pulley 74 is mounted on the output shaft 82. There is positioned on the feed unit 22 a motor mount 84. The motor 80 is positioned on the motor mount 84. There is a housing 78 enclosing the first pulley 72, the second pulley 74, and the belt 76.

On the outside of the wall 40 there is positioned a third bearing 86. There is a stub shaft 87. Between the wall 40 and the wall 67 there is a second gear 88 having a hub 89. There is mounted on the outside of the outside wall 67 a fourth bearing 90. The stub shaft 87 is journalled in the fourth bearing 90, passes through the outside wall 67, and is journalled in the third bearing 86. Then the stub shaft passes through the passageway in the wall 40 and into the chamber of the feed unit 22. The second gear 88 is positioned on the stub shaft 87. The second gear 88 meshes with the first gear 66. The first gear 66 being in a driving relation to the second gear 88. A union 91, in phantom, by means of pins 93 connects together the shafts 87 and 52.

It is to be understood that with the motor 80 and the output shaft 82 rotating the second pulley 74 rotates so as to drive the first pulley 72. The first pulley 72 drives the drive shaft 70 which causes the first gear 66 to rotate and also causes the first shaft 48 to rotate. With the first gear 66 rotating the second gear 88 rotates causing the stub shaft 87 and the second shaft 52 to rotate.

In the drawings it is seen that on the right end of the shafts 48 and 52 there are no screw threads or no augers. The shafts 48 and 52 have a free end. The free end of each shaft is not journaled in a bearing but can "float". Again, on the right end of the shafts 48 and 52 there are no screw threads. The plug to the right of the screw threads is referred to as the free push part of the plug. This is required to assure that the plug is in place. This gives the operator sufficient time to stop the still, without losing steam, if there should be an interruption in the flow of the fibrous material of plant origin to the still.

There is a cover 94 for the surge bin and, in FIG. 4 it is seen that the cover 92 has on the sides downwardly directing lips so as to overlay the outwardly directed lip or platforms on the upper end of the sides of the trough 38. In the cover 92 there is an opening 94. Also, it is seen that in the cover 92, that part other than the opening 94, that on the inner part of the cover 92 or on the lower surface that there is a filler 96 having a first curved surface 98 for close proximity to the screw 50 and having a second surface 100 for close proximity to the screw 54. In operation the two screws 50 and 54 rotate in opposite directions. One screw rotates in a counter clockwise overlap. The fibrous material of plant origin is fed through the opening 94 and to the two sections 56 and 60 of large pitch, a 15 inch pitch. The screws force the fibrous material to the sections 58 and 62 of smaller pitch, 12 inch pitch. In the 12 inch pitch the fibrous material is compressed to form a plug. To assist in forming the plug the filler 96 is positioned above the sections 58 and 62 of the screws so as to prevent the fibrous material of plant origin to rise upwardly and preclude the formation of the plug. With the fibrous material of plant origin being compressed and passing from the 15 inch pitch screws to the 12 inch pitch screws and also the filler 96 in position the fibrous material must form a plug. The plug serves the useful purpose of acting as a closed valve to prevent the vapor of volatile organic material passing through the discharge unit and out of the opening 94 and the cover 92.

In FIG. 2 it is seen that the feed unit 22 comprises a surge bin 102 positioned above the opening 94 of the cover 92. The surge bin 102 has four sides 104. At the top of the surge bin 102 there is an opening 106. From the opening 106 and travelling downwardly the four sides 104 spread outwardly to connect with the cover 92 around the opening 94. The opening 94 is a larger opening than the opening 106.

The screws 50 and 54 force the fibrous material of plant origin, in a plug form, toward the discharge end 42.

At the discharge end 42 and near the downwardly directed wall 46 and the end wall 44 there is a shaft 110. The downwardly directed wall 46 and the end wall 44 define an opening 111 in the discharge end 42.

On the outside of one wall of the trough 38 there is a bearing 112 and on the outside of the other wall of the trough 38 there is a bearing 114. The shaft 110 is journalled into the bearings 112 and 114 and passes through the walls of the trough 38.

Between the walls of the trough 38 there is a first circular member 116 mounted on the shaft 110, near the bearing 112. There is a second circular member 118 mounted on the shaft 110 near the bearing 114. There is welded to or mounted on the circular members 116 and 118 cutter bars 120. These cutter bars 120 may be angle iron.

On the outside of the trough 38 there is a motor mount platform 122. There is a motor 124 positioned on the platform 112. On the output shaft of the motor 124 there is a first pulley 126. On the shaft 110 there is a second pulley 128. A belt 130 runs between the pulleys 126 and 128 so that the pulley 126 is in a driving relationship with the pulley 128.

With the plug of fibrous material of plant origin approaching the discharge end 42, the rotating shaft 110 and the cutter bars 120 the plug of fibrous material is broken and chopped away so as to be in small units and to fall through the opening 111. It is necessary to break this plug into small units so that it can fall through the opening 111 and into the cookers. The small units cook more evenly than large irregular units. The cutter bars 120 spread and fluff the small units.

In FIG. 2 there is schematically illustrated, in phantom, the plug 132 and the small units 134 which have been broken away from the plug 132 by the discharge cutter or discharge reel 108.

The top cutter 24 is, generally, a trough 140 having a bottom 142 and upwardly curved sidewalls 144. On the top of each side wall 144 there is an outwardly directed flange 146. In FIG. 6 it is seen that the general appearance of the trough 140 is of a U-configuration.

At the left of the cooker 124 there is an upwardly directed circular wall 150 comprising an inlet opening 152 to the trough 140.

There is positioned in the trough 140 a first shaft 151. On the first shaft 151 is a first screw or first auger 153. There is also positioned on the trough 140 a second shaft 154 and on the second shaft 154 there is a second screw 156.

In FIG. 11 it is seen that at the right end of the trough 140 there is an outside end wall 158. At the left of the trough 140 there is an inner end wall 160 and there is also an outside end wall 162.

On the outside of the end wall 158 there is a bearing 164. On the outside of the end wall 160 there is a bearing 166. The first shaft 151 passes through the end wall 158 and is journalled in the bearing 164. It is seen that there is a first stub shaft 168. On the outside of the end wall 162 there is a bearing 170. The stub shaft 168 is journalled in the bearing 170 and passes through the outside end wall 162 and is also journalled in the bearing 166. Then the stub shaft 168 passes through the wall 160. The shaft 168 is joined to the shaft 151 by a union 169, in phantom, and pins 171, in phantom, see FIG. 11. There is positioned on the first stub shaft 169, a first gear 174. The hub of the first gear 174 is identified by reference numeral 172.

On the outside of the end wall 158 there is a second bearing 176. On the outside of the inner end wall 160 there is a bearing 178. The shaft 154 passes through the end wall 158 and is journalled in the bearing 176. There is a second stub shaft 180. On the outside of the end wall 162 there is a bearing 182. The second stub shaft 180 is journalled in the bearing 182 and passes through the end wall 162 and is then journalled in the bearing 178. There is positioned on the second stub shaft 180 a gear 186 having a hub 184. The second gear 186 meshes with the first gear 174 so that the first gear 174 is in a driving relationship to the second gear 186. The stub shaft passes through the wall 160. A union 161, in phantom, joins the shafts 180 and 154 by means of pins 163 in phantom, so as to be in a driving relation to the shaft 154.

Figure 1:
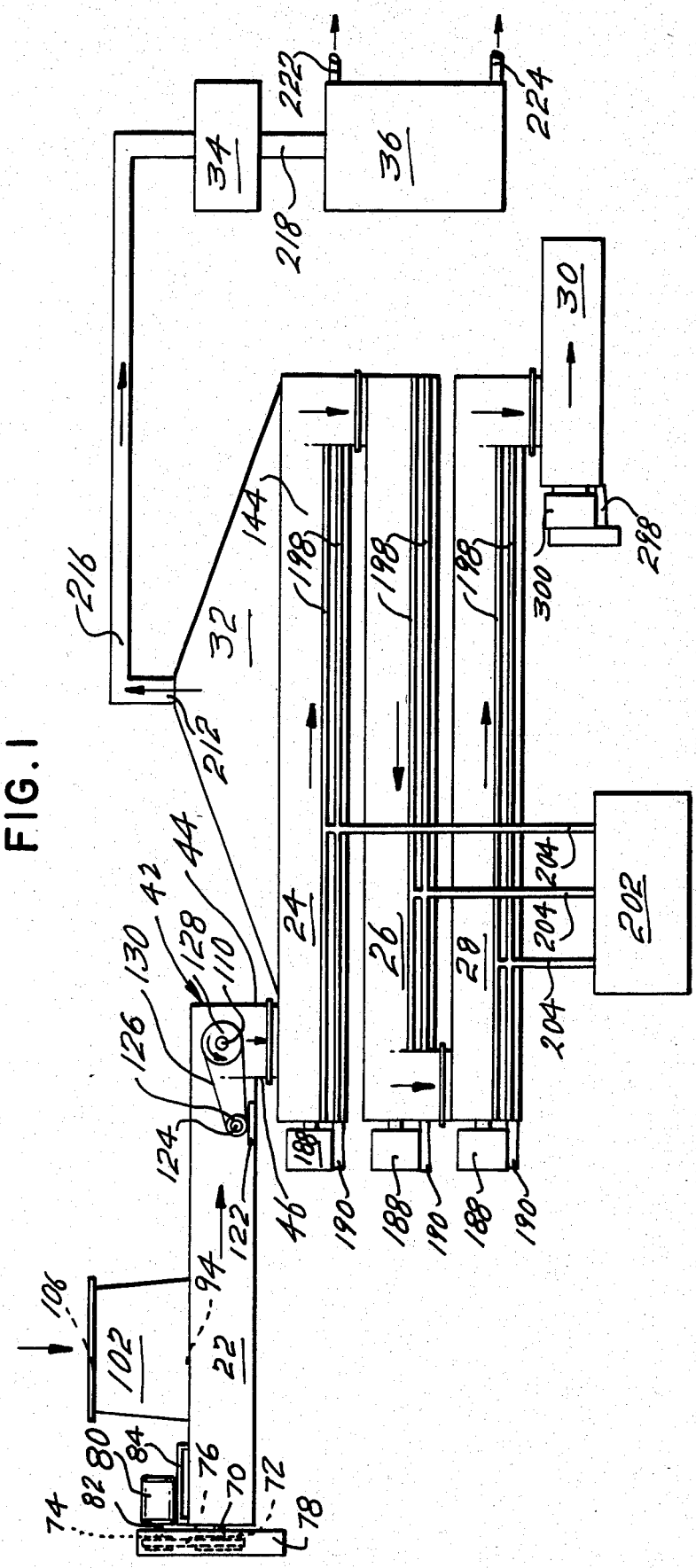
FIG. 1 is an overall illustration of the continuous still, in a side elevational view, and shows the cooker, three cookers, the feed unit to the cookers, the discharge unit from the cookers, the condenser and the separator.

In FIG. 1 it is seen that there is a motor 188 which connects with the first stub shaft 168 so as to rotate the first stub shaft 168, the first gear 174, the first shaft 151 and the first screw 153. With the rotation of the first gear 174 the second gear 186 is rotated to rotate the second stub shaft 180 and the second screw 156. It is to be realized that the screws 153 and 156 rotate in opposite rotational directions. There is a mounting platform 190 connected to the left end of the first cooker 24. The electric motor 188 is positioned on the mounting platform 190 so as to be a driving relationship with the first stub shaft 168.

In FIG. 5 it is seen that at the right of the cooker 24 that there is a downwardly directed circular wall 192 which defines an outlet opening 194 from the cooker 24. As, previously stated, at the left of the cooker 24 there is an upwardly directed circular wall 150 which defines an inlet opening 152 for receiving the pieces 134 of the fibrous material of plant origin. These pieces 134 drop through the outlet opening 111 of the feed unit 22 and pass through the inlet opening 152 into the cooker 24. From the cooker 24 the material passes from the cooker 24 through the outlet opening 194. The screws 153 and 156 agitate and move the pieces 134 so as to have a fresh surface exposed to the steam for removing organic material from the fibrous material.

In FIGS. 6 and 7 it is seen that in the side wall 144 of the trough 140 there are a number of steam ports 196. There is a steam manifold 198 running on the outside of the side wall 144 and connecting with the steam ports 196. There is a steam opening 200 in the manifold 198 and which steam opening 200 connects with the steam port 196.

In FIG. 1 it is seen that there is a steam generator 202 which, by means of a steam line 204, connects with the steam manifold 198.

On the upper surface of the bottom 142, inside of the trough 140, there is an angular member 201 running longitudily on the bottom of the trough and between the two screws 153 and 156.

In operation the two screws rotate so as to move the pieces 134 of plant material in the cooker, from the inlet opening 152 to the outlet opening 194. The pieces 134 of plant material are loosely positioned in the cooker 24, about five inches deep, and are continuously agitated so as to expose fresh surfaces to the steam. The steam entering through the ports 196 contacts the pieces 134 and volatilizes the volatile organic material in the fibrous material of plant origin. With the volatilization of the organic material there is prepared a vaporous mixture of steam and volatile organic material.

The vaporous mixture of steam and volatile organic material is collected in the hood 32. The hood 32 is over the open top 148 of the trough 140. The hood 32 should be firmly attached to the trough 140, usually, to the outwardly directed flange 146, so as to prevent the escape of vaporous mixture of organic material and steam. From the hood 32 the vaporous mixture passes through the outlet 212 and through a conveyor pipe or tube 216 to a condenser 34. In the condenser 34 the vaporous mixture is condensed into a liquid mixture of water and liquid organic material. From the condenser 34 the liquid mixture passes through connecting pipes 218 to a separator 36. In the separator 36 the lighter organic material 222 is separated from the water 224. Generally, liquid organic material has a lower specific gravity than water. Also, the liquid organic material and the water are, generally, immiscible. The separator may comprise a large tank. The liquid mixture of water and liquid organic material can be introduced into the large tank and let stand. In time the liquid organic material will separate from the water and float on the water. The liquid organic material can be drawn off from the top of the tank and the liquid water can be drawn from the bottom of the tank.

Another type of separator can be a centrifugal separator such as is used to separate butter fat in whole milk from the skim milk.

In FIG. 1 it is seen that there are three cookers, 24, 26 and 28. The cookers 26 and 28 are similar to cooker 24 except that there is a cover 226 on the cookers 26 and 28. If the cover were not present the vaporous mixture of steam and volatile organic material would escape. There is an inlet end for the cooker 26 and also for the cooker 28. The inlet end of the cooker 26 connects with the outlet end of the cooker 24. The outlet end of the cooker 26 connects with the inlet end of the cooker 28. It is to be realized that in the cover 226 that there is an opening so as to have the inlet end connect with the outlet end of the preceeding cooker.

The screws 151 and 154 in the cookers 24 and 28 rotate in the same direction while in the cooker 26 the screws 151 and 154 rotate in a direction opposite to the direction of the rotation of the screws 151 and 154 of the cookers 24 and 28.

The steam line 204 from the steam generator 202 connects with the steam manifolds of the cookers 28, 26, and 24. The volatile organic material is formed into a vaporous mixture in the cooker 28 and passes upwardly into the cooker 26. In the trough 140 of the cookers 24, 26 and 28, and on the upper surface of the bottom 142 there is an angle member 201 having passageways 203. The member 201 is positioned above a passageway 205 in the bottom 142. The steam line connects with the passageway 203 with the result that steam is introduced into the bottom and center of the appropriate cooker. In the cooker 26 the volatile organic material from the cooker 28 mixes with volatile organic material in the cooker 26 and passes upwardly into the cooker 24. In the cooker 24 the volatile organic material from the cooker 24 mixes with the volatile organic material from the cooker 26 and the cooker 28 and passes upwardly into the hood 32 and from there to the condenser 34 where it is condensed with the steam and volatile organic materials to a liquid mixture of water and liquid organic material and from there passes through the separator 36. Again, the screws 151 and 154 in the cooker 24, 26 and 28 agitate the pieces 134 of the fibrous material of plant origin so as to expose fresh surfaces to the steam. In the cookers 24, 26 and 28 the fibrous material is about 5 inches deep and is agitated. The volatile organic material is removed in the time period of about 5 minutes to 8 minutes while in the cooker.

It is to be understood that the number of cookers 24, 26 and 28 can vary. For example, in certain instances it may be necessary to have only one cooker 24. Also, the length of the cookers 24, 26 and 28 can vary. The length of the cookers 24, 26 and 28, the speed of rotation of the screws 151 and 154, the number of cookers 24, 26 and 28 can vary depending upon the fibrous material of plant origin. With respect to a mint hay the depth of the pieces 134 is about 5 inches. To repeat, in certain instances, only one cooker may suffice to process the the fibrous material of plant origin.

The discharge unit 30 comprises a trough 238 having a bottom 240 and upward side walls 242. There is a cover 244 over the major portion of the discharge unit 30 or the trough 238.

In FIG. 10 it is seen that in the middle and positioned on the upward surface of the trough 238 is an angle member 246. Also, in FIG. 10, it is seen that on the lower surface of the cover 244 there is a first curved surface 248 and a second curved surface 250.

In FIG. 8 it is seen that at the left of the discharge unit 30 there is a circular rim 252 defining an opening 254 into the trough 238. The circular rim 252 of the discharge unit 30 connects with the circular wall 192 of an appropriate cooker. The outlet opening 194 from an appropriate cooker connects with the inlet opening 254 of the discharge unit so that the residue from the fiber of material of plant origin can flow into the discharge unit.

The discharge unit 30 has an open end 256.

In the discharge unit 30 there is first shaft 258. On the first shaft 258 there is a screw 260 or a first auger 260. The first screw 260 has a large pitch 262, a 15 inch pitch, and a small pitch 264, a 12 inch pitch.

In the discharge unit 30 there is also a second shaft 266. On the second shaft 266 there is a second screw 268. The second screw 268 has a large pitch 270, a 15 inch pitch, and a small pitch 272, a 12 inch pitch.

The first screw 260 and the second screw 268 overlap.

The large pitches 262 and 270 are underneath and in the vicinity of the opening 254. The small pitches 264 and 272 are in that portion of the trough 238 which is covered by cover 244. In FIGS. 8 and 9 it is seen that the right end portion of the shafts 258 and 266 are free and do not carry a screw or an auger.

In the left part of the discharge unit 30 there is an end wall 274 and to the left of the inner end wall 274 there is an outer end wall 276. On the outside or on the left of the inner end wall 274 there is a first seal 278. To the left of the first seal 278 there is a first bearing 280. There is a first stub shaft 282. There is a second bearing 284, on the outer wall 276. The first stub shaft 282 is journalled in the second bearing 284, passes through the wall 276, is journalled in the bearing 280, passes through the wall 274 and connects by means of a union 283, in phantom, and pins 285, in phantom, to the shaft 258.

There is positioned on the first stub shaft 282 a gear 286.

In the discharge unit 30 there is a second shaft 266.

On the outer surface or the left surface of the inner end wall 274 there is a second seal 288. On the outside of the second shaft 266, there is a third bearing 290.

The seals 278 and 288 are desirable as some steam and volatile organic material from the cookers may get into the discharge unit 30. In the discharge unit 30 there is a discharge plug to which prevents the escape of the steam and volatile organic material. In the cookers the steam and volatile organic material rises and is collected in the hood 32 and passes out of the opening 212 and through the pipe 216 to the condenser 34.

On the outside of the outer end wall 276 or on the left surface there is positioned a fourth bearing 294. A second stub shaft 292 is journalled in the fourth bearing 294 and passes through the outer end wall 276. The second stub shaft 292 is also journalled in the bearing 290. Then, the shaft 292 passes through the wall 274. A union 291 or coupler 291 connects together the shafts 292 and 266 with the aid of pins 293. There is positioned on the second stub shaft 292 a second gear 296. The first gear 286 and the second gear 296 mesh with each other with the first gear 286 being the driving gear and the second gear 296 being the driven gear.

In FIG. 1 it is seen that on the left of the discharge unit 30 that there is a mounting platform 298. A motor 300 is positioned on the mounting platform 298 and is in a driving relationship with the first stub shaft 282. With the electric motor 300 rotating the first stub shaft 282 the first gear 286 is rotated. Likewise the first shaft 258 is rotated and the first screw 260 is rotated. With the rotation of the first gear 286 the second gear 296 is rotated so that the second shaft 266 is rotated. It is to be understood that the first screw 260 rotates in one direction and the second screw 268 rotates in the opposite direction.

With the residue from the fibrous material of plant origin passing through the opening 254 and falling on the large pitches 262 and 270 of the screws 260 and 268 the residue is moved towards the small pitches 264 and 272. The small pitches 264 and 272 make a plug in the discharge unit 30. The plug is, essentially, a closed valve to prevent the escape of the vaporous mixture of steam and of the volatile organic material through the open end 256 of the discharge unit. Again, the discharge unit is tightly sealed to the cooker so as to prevent the escape of the vaporous mixture between the junction of the cooker and the discharge unit. As with the feed unit 22 the plug seals the discharge unit 30 so that the vaporous mixture is precluded in passing from the discharge unit 30 through the open end and must pass from the cooker 24 to the hood 32.

The residue from the fibrous material of plant origin passes out the open end 256 and can fall into a truck or a tank or other suitable means for removing the residue.

In FIG. 9 there is a schematic illustration of the plug 300, in phantom as it is moving through the discharge unit 30. The plug 300 is continuous while in the discharge unit 30. Also, in FIG. 9 there is a schematic illustration, in phantom, of the plug.

The union 73 may also be welded by weld 77 to the shafts 70 and 48.

The union 283 may also be welded by weld 287 to the shafts 282 and 258.

The union 291 may also be welded by weld 295 to the shafts 292 and 266.

The union 169 may also be welded by weld 173 to the shafts 168 and 151.

The union 161 may also be welded by weld 165 to the shafts 180 and 154.

In FIG. 13 there is illustrated the process for separating a volatile organic material in a fibrous material of plant origin from other components in the fibrous material. It is seen that there is a fibrous material of plant origin 300. This fibrous material is processed in a continuous cooking step 302. Steam 304 is introduced to the fibrous material in step 302 so as to form a vaporous mixture 306 of the volatile organic material and steam or water vapor and to leave a residue 308. The residue 308 can be discarded or, the residue 308 may be used as mulch or a feed for livestock.

The vaporous mixture 306 in condensing step 310 is condensed to a liquid mixture of liquid organic material and water. Then, the liquid mixture of organic material and water is allowed to separate in separating step 312 into liquid organic material 314 and into an aqueous solution 316. Generally, the liquid organic material and the water are immiscible and, generally, the organic material has a lower specific gravity than the water so the liquid organic material will float to the top and the water will settle to the bottom. The liquid organic material 314 can be removed at the top of the separating unit and the aqueous solution 316 can be removed at the bottom of the separating unit. The fibrous material of plant origin can be mint hay. The liquid organic material 314 can be mint oil such as peppermint oil or spearmint oil.

In FIG. 14 there is illustrated the process for operating the continuous still 20 to produce liquid organic material 314 from fibrous material of plant origin 300. At the top of FIG. 14 it is seen that the fibrous material is compressed in compression step 320 to form a plug in the feed unit 22. The plug acts as a closed valve to prevent the escape of a vaporous mixture 306 from the continuous still 20. Then in separation step 322 the plug is separated and divided to form a loosely assembled fibrous material in the cookers 24, 26 and 28. In the cooking step 302 steam is introduced into the loosely assembled fibrous material so as to separate the volatile organic material and to leave a residue. In compression step 324 the residue is compressed to form a plug in the discharge unit 30. The plug acts as a closed valve to prevent the escape of vaporous mixture 306 of volatile organic material and steam. The plug is discharged as residue 308.

The vaporous mixture of volatile organic material and steam 306 is condensed in condensing step 310 to a liquid mixture of liquid organic material and water. The liquid mixture of liquid organic material and water is allowed to separate in separating step 312 to form the liquid organic material 314 and the aqueous solution 316. The liquid organic material 314 will, generally, float on top of the aqueous solution 316 and can be removed at the top of the separating unit and the aqueous solution 316 can be removed at the bottom of the separating unit.

The size of the continuous still can vary depending upon the amount of fibrous material of plant origin to be processed. For example, the feed unit can have an overall length of about 13 feet 9 inches with the length inside of the trough 38 from the wall 40 to the downwardly directed wall 46 of a length of about 12 feet one inch. The width of the trough is about 3 feet 6 inches. To recall, there is a first auger or first screw 50 and a second auger or second screw 54 with varying pitches from 15 inch pitch underneath the surge bin to a 12 inch pitch inside of the covered trough so as to compress the fibrous material into a plug. The two screws or augers 50 and 54 overlap and the two screws or augers 260 and 268 overlap. The reason for the overlap of the augers is to keep the fibrous material from turning with the augers while being compressed into a plug by the smaller pitch of the augers 58 and 62 associated with the augers 50 and 62 associated with the augers 50 and 54 and the smaller pitch of the augers 264 and 272 associated with the augers 260 and 268. The surface area of the auger is more than the surface area of the tube or housing around the augers. If the augers did not overlap the fibrous material would turn with the augers and would not be pushed by the augers. By overlapping the augers the fibrous material cannot turn and as a result the fibrous material is pushed by the augers. The distance between the ends of the 12 inch pitch screws and the discharge cutter or discharge reel 108 is about 30 inches so as to have a plug of fibrous material in this region of the feed unit or inside the trough 38. The speed of revolution of the screws 50 and 54 can be about 13 RPM.

The cooking unit 24, 26 or 28 can have a length of about 20 feet. The width of the trough 24 is about 3 feet 6 inches. Again, there are two screws 153 and 156. The pitch of these two screws is 10 inches. These two screws do not overlap. The purpose of the two screws 153 and 156 is to continually turn the fibrous material so as to expose fresh fibrous material to the steam so as to assist in vaporizing or volatilizing the volatile organic material and to separate the volatile organic material from the residue. The speed of rotation of these two 10 inch pitch screws is about 32 RPM. The discharge unit 30 can have the same approximate dimensions as the feed unit 22. For example, the overall length of the discharge unit 30 can be about 13 feet 9 inches while the length of the side of the trough is about 21 feet one inch. The width of the trough 238 is about 3 feet 6 inches. Again, there are two screws, a first screw 260 and a second scew 268. Underneath the inlet to the trough 238 the screws have a pitch of 15 inches and underneath the covered portion of the trough 238 the screws have a pitch of about 12 inches so as to form a plug of the fibrous residue. Also, between the ends of the screws 260 and 268 and the discharge part of the trough 238 there is a distance of about 30 inches in which the fibrous plugs move. Further, the two screws 260 and 268 overlap.

Some of the features of this invention are that we have disclosed and described a continuous still as opposed to a batch still, for processing a fibrous material of plant origin such as mint hay, to realize an organic material such as mint oil. We consider that because the still is a continuous still less time is required to remove the mint oil from the mint hay. As, previously, stated in a batch still the mint hay is cooked for about one and one half hours, while with this continuous still the mint hay is cooked for about five minutes to 8 minutes. It can be seen that there is considerable difference in time between one and one half hours and 5 minutes to 8 minutes.

Another feature of this invention is that we consider less heat energy is required to remove the mint oil from the mint hay as less fuel is required. In the year 1980 approximately 7,108,000 pounds of mint oil was realized and approximately 7,108,000 gallons of diesel oil was needed to realize this mint oil. With the continuous still only about one third of the amount of diesel oil would be required or, about 2,370,000 gallons of diesel oil. This translates into a savings of about 4,738,000 gallons of diesel oil or, with diesel oil at one dollar a gallon a savings of about $4,738,000. As the mint hay is in the cooker for a considerabley less period of time in the continuous still, about 5 minutes to 8 minutes, as compared with a batch still of about one and one half hours, less energy is required. Further, the continuous still can be insulated to result in a less loss of heat as compared to a batch still. The batch still is of such a dimension that it is not practical to insulate the batch still.

As less time is required to cook the mint hay in the still, fewer stills are required which means a lower capital investment and therefore less cost for units of mint oil realized. With less time to cook the mint hay in this continuous still less labor is required and therefore less cost for preparing the mint oil. Also, with the continuous still fibrous material is used as a plug to prevent the escape and loss of a vaporous mixture comprising the volatile mint oil and steam. In essence, substantially all of the mint oil in the mint hay is recovered.

We consider our invention to be new and unobvious as we have no knowledge or information of a continuous processing unit or a continuous still for the processing of mint hay to distill and to separate mint oil. We live in an area where mint hay is grown and the mint oil separated from the mint hay. The only method and apparatus with which we are acquainted for separating the mint oil from the mint hay is the batch apparatus and method which we have described in this specification.

In the preparation of this patent application a patent search was made and two patents were selected in the search. These are:

Hodgin, U.S. Pat. No. 2,290,806
Zenlea, U.S. Pat. No. 2,422,874

These two patents are directed to the continuous distillation of a chemical such as theobromine. There is the continuous destructive distillation of a material such as cocoa to produce the theobromine. We consider that our invention defines over these two patents of Hodgin and Zenlea.

We consider the invention to be useful as this invention teaches of the continuous cooking of mint hay so as to continuously separate mint oil from the mint hay. This invention is of value as it makes possible to separate mint oil from mint hay with less energy than is required in the batch system for separating mint oil form mint hay.

I claim:

1. A continuous still comprising:
   a. a cooking unit;
   b. a feed unit connecting with said cooking unit for introducing material into said cooking unit;
   c. a means to introduce heat energy into said cooking unit to heat said material to separate said material into vapors of organic material and a residue;
   d. a means in said cooking unit to agitate said material to assist in separating said material into vapors of organic material and said residue;
   e. a collector means operatively connecting with said cooking unit for collecting said vapors of organic material;
   f. a means in said feed unit to form a plug of said material to preclude the main part of said vapors of organic material passing through said feed unit;
   g. a discharge unit for said residue;
   h. said cooking unit operatively connecting with said discharge unit to discharge said residue to said discharge unit;
   i. a means in said discharge unit to form a plug of said residue to preclude the main part of said vapors of organic material passing through said discharge unit;
   j. said feed unit comprising a first screw and a second screw;
   k. said first screw and said second screw overlap;
   l. said first screw and said second screw rotate in opposite directions to force said material into said plug to preclude the main part of said vapors or organic material passing through said feed unit;
   m. said discharge unit comprising a third screw and a fourth screw;
   n. said third screw and said fourth screw overlap; and,
   o. said third screw and said fourth screw rotate in opposite directions to force said residue into said plug to preclude the main part of said vapors of organic material passing through said discharge unit.

2. A continuous still for processing a plant comprising fiber and organic material to separate said organic material, said continuous still comprising:
   a. a cooking unit;
   b. a feed unit connecting with said cooking unit for introducing material into said cooking unit;
   c. a first augur having screw threads in said feed unit;
   d. a means to introduce said plant to said first augur;
   e. said first augur having at least two pitches of the screw threads;
   f. one of said pitches between a large pitch and the other one of said pitches being a small pitch to form a plug in said feed unit to prevent the escape of said organic material by means of said feed unit;
   g. said pitches being introduced into said feed unit so as to contact said large pitch prior to contacting said pitches;
   h. a second augur having screw threads;
   i. said second augur agitates said pitches to assist in separating said organic material;
   j. a means to introduce steam to said cooking unit to volatilize said organic material to make vapors of said organic material separate to said vapors of organic material from said fiber;

k. a collector means operatively connecting with said cooking unit for collecting said vapors of organic material;

l. a means in said feed unit to preclude the main part of said vapors of organic material passing through said feed unit instead of said collector means;

m. said cooking unit operatively connecting with said discharge unit to discharge said residue to said discharge unit;

n. a means in said discharge unit to preclude the main part of said vapors of organic material passing through said feed unit instead of said discharge unit o. a third augur in said discharge unit having screw threads with at least a large pitch and a small pitch to form a plug in said discharge unit to prevent the escape of said organic material by means of discharge unit; and, p. said discharge unit being capable of discharging said fiber.

3. A continuous still for processing a plant according to claim 2 and comprising:
   a. said cooking unit comprising a plurality of cooking units.

4. A continuous still for processing a plant according to claim 3 and comprising:
   a. said feed unit, said cookings units and said discharge unit being, substantially, horizontal.

5. A continuous still for processing a plant comprising fiber and organic material to separate said organic material, said continuous still comprising:
   a. a feed unit having a first inlet opening and a first outlet opening;
   b. said feed unit comprising first screw and a second screw;
   c. said first screw and said second screw overlap;
   d. said feed unit being enclosed between said first inlet opening and said first outlet opening;
   e. said plant being introduced into said feed unit through said first inlet opening;
   f. said first screw and said second screw each having at least a large first pitch and a small second pitch for said pitch to contact said first pitch and then said second pitch to form a plug in said feed unit to prevent vapors of said organic material escaping through said first inlet opening;
   g. a cooking unit having a second inlet opening and a second outlet opening;
   h. said first outlet opening, operatively, connecting with said second inlet opening;
   i. a collector means operatively connecting with said cooking unit to collect vapors of said organic material;
   j. said cooking unit comprising a third screw to agitate said plant to assist in separating said vapors of organic material from said fiber;
   k. a discharge unit having a third inlet opening and a third outlet opening;
   l. said second outlet opening operatively connecting with said third inlet opening;
   m. said discharge unit being enclosed between said third inlet opening and said third outlet opening;
   n. said discharge unit comprising a fourth screw and a fifth screw;
   o. said fiber being introduced from said cooking unit into said discharge unit through said third inlet opening;
   p. said fourth screw and said fifth screw overlap and each having a large first pitch and a large second pitch for said fiber to contact said first pitch and then said second pitch to form a plug in said discharge unit to prevent said vapors of organic material escaping through said third outlet opening;
   q. said fiber leaving said discharge unit through said third outlet opening; and,
   r. a means to introduce steam into said cooking unit to form said vapors of organic material from said organic material.

6. A continuous still for processing a plant according to claim 5 and comprising:
   a. said first screw and said second screw rotate in opposite directions to force said plant to form said plug; and,
   b. said fourth screw and said fifth screw rotate in opposite directions to force said fiber to form said plug.

7. A continuous still for processing a plant according to claim 5 and comprising:
   a. a plurality of cooking units between said feed unit and said discharge unit;
   b. the first of said plurality of cooking units, operatively, connecting with said feed unit and the last of said cooking units, operatively, connecting with said discharge unit; and,
   c. said cooking units, operatively, connecting together.

8. A continuous still for processing a plant according to claim 7 and comprising:
   a. a means to transform said vapors of organic material into a liquid.

9. A continuous still for processing a plant according to claim 8 and comprising:
   a. said feed unit, said cooking units and said discharge unit being, substantially, horizontal.

* * * * *